United States Patent
Templin et al.

[11] Patent Number: 6,139,085
[45] Date of Patent: Oct. 31, 2000

[54] TARP COVER ARRANGEMENT FOR A TRANSFER DUMP SYSTEM

[75] Inventors: Robert E. Templin; Mary K. Templin, both of Phoenix, Ariz.

[73] Assignee: Aero Industries, Inc., Indianapolis, Ind.

[21] Appl. No.: 09/247,904

[22] Filed: Feb. 11, 1999

[51] Int. Cl.$^7$ ...................................................... B60P 7/04
[52] U.S. Cl. ................................. 296/100.13; 296/26.09; 296/105
[58] Field of Search .......................... 296/100.11, 100.12, 296/100.13, 104, 105, 26.09, 181

[56] References Cited

U.S. PATENT DOCUMENTS

| | | | |
|---|---|---|---|
| 1,627,716 | 5/1927 | Teachout | 296/105 |
| 4,189,178 | 2/1980 | Cramaro | 296/105 |
| 4,215,897 | 8/1980 | Aiken et al. | 296/100.11 |
| 4,948,155 | 8/1990 | Smith et al. | 280/149.2 |
| 4,995,663 | 2/1991 | Weaver et al. | 296/100.11 |
| 5,080,423 | 1/1992 | Merlot et al. | 296/105 |
| 5,102,182 | 4/1992 | Haddad, Jr. | 296/100.13 |
| 5,112,097 | 5/1992 | Turner, Jr. | 296/100.12 |
| 5,143,496 | 9/1992 | Smith et al. | 410/68 |
| 5,145,230 | 9/1992 | Biancale | 296/100.13 |
| 5,152,575 | 10/1992 | DeMonte et al. | 296/105 |
| 5,219,260 | 6/1993 | Smith et al. | 414/345 |
| 5,240,304 | 8/1993 | Cramaro et al. | 296/100.11 |
| 5,253,914 | 10/1993 | Biancale | 296/100.13 |
| 5,354,113 | 10/1994 | Petterson | 296/98 |
| 5,505,580 | 4/1996 | Alstad et al. | 414/499 |
| 5,580,211 | 12/1996 | Mengel | 414/812 |
| 5,938,270 | 8/1999 | Swanson et al. | 296/100.11 |
| 6,007,138 | 12/1999 | Cramaro | 296/100.11 |

*Primary Examiner*—D. Glenn Dayoan
*Assistant Examiner*—Paul Chenevert
*Attorney, Agent, or Firm*—Laubscher & Laubscher

[57] ABSTRACT

A tarp cover arrangement for a transfer dump system includes a front tarp cover for covering the front truck container, and a rear tarp cover for covering the rear truck container, characterized by the provision of a front cover drive device mounted at the front end of the front container, and a rear cover drive device mounted at the rear end of the rear container. In order to prevent an obstruction at the front end of the front container, the front cover drive device is mounted forwardly of the front wall of the front container, and a tarp storage tray is provided for storing the tarp when in the collapsed open condition. In order to minimize the extent to which the idler pulleys protrude laterally beyond the side walls of the rear container, the idler pulleys of the rear cover drive cable are mounted forwardly of the front wall of the rear truck. The support tube for the rear cover drive device is contained between the side walls of the rear container.

17 Claims, 12 Drawing Sheets

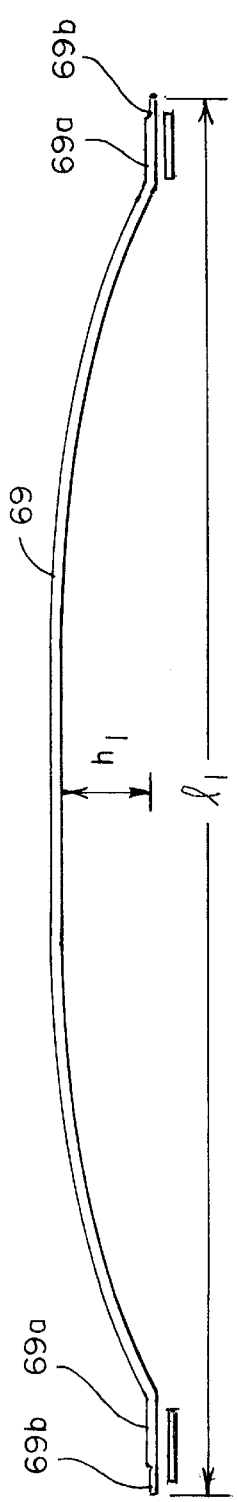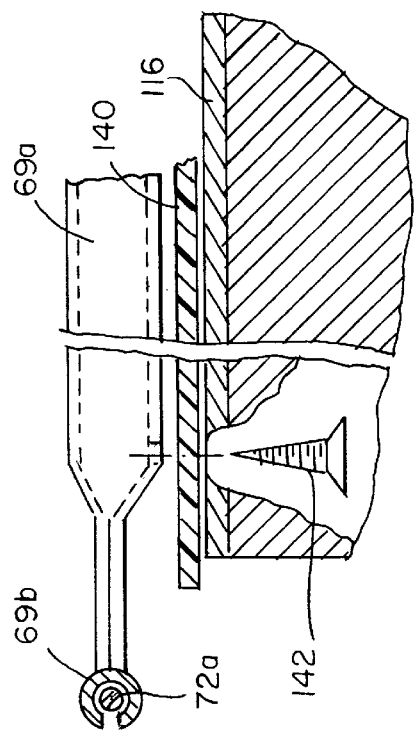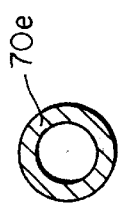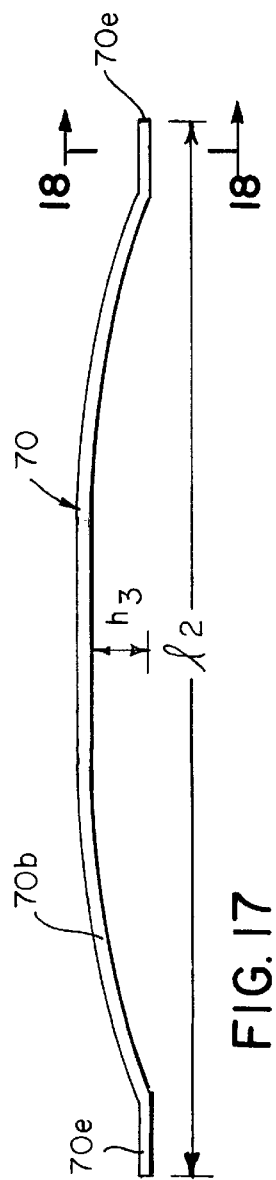
FIG. 14
FIG. 15
FIG. 17
FIG. 18

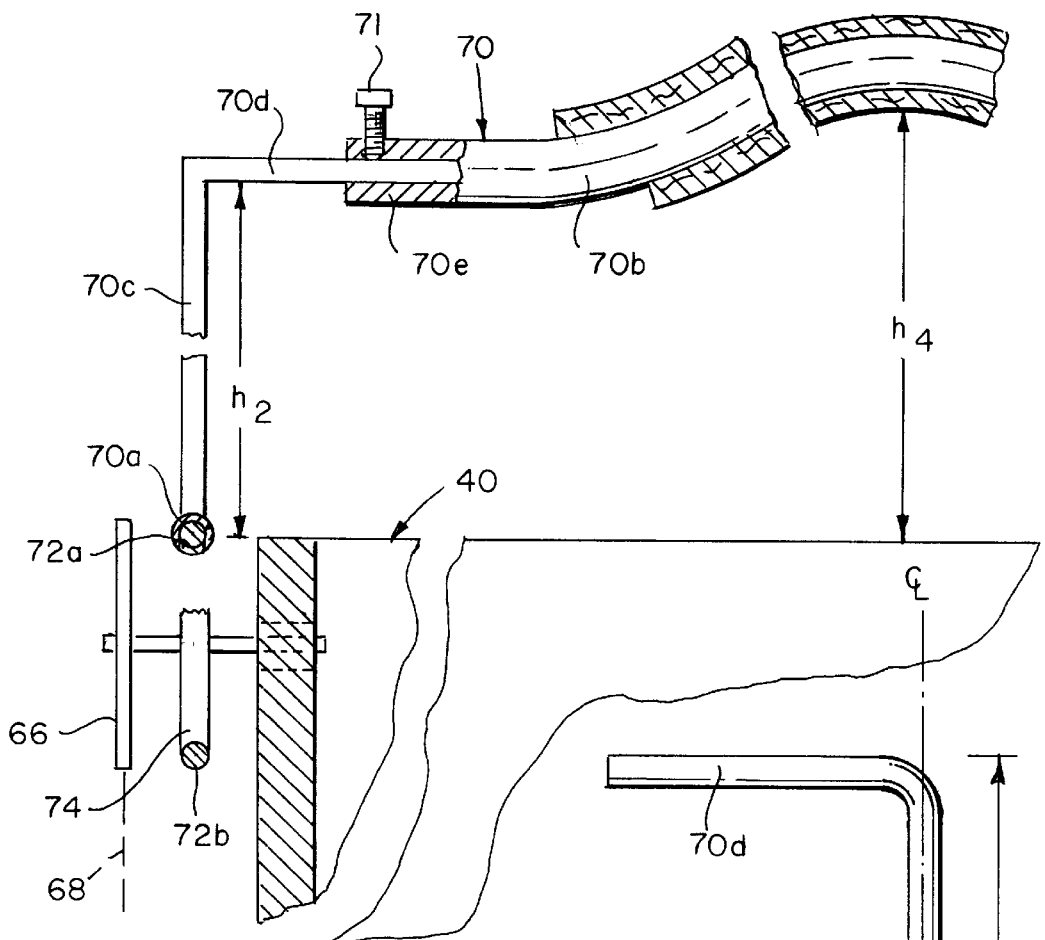
FIG. 16
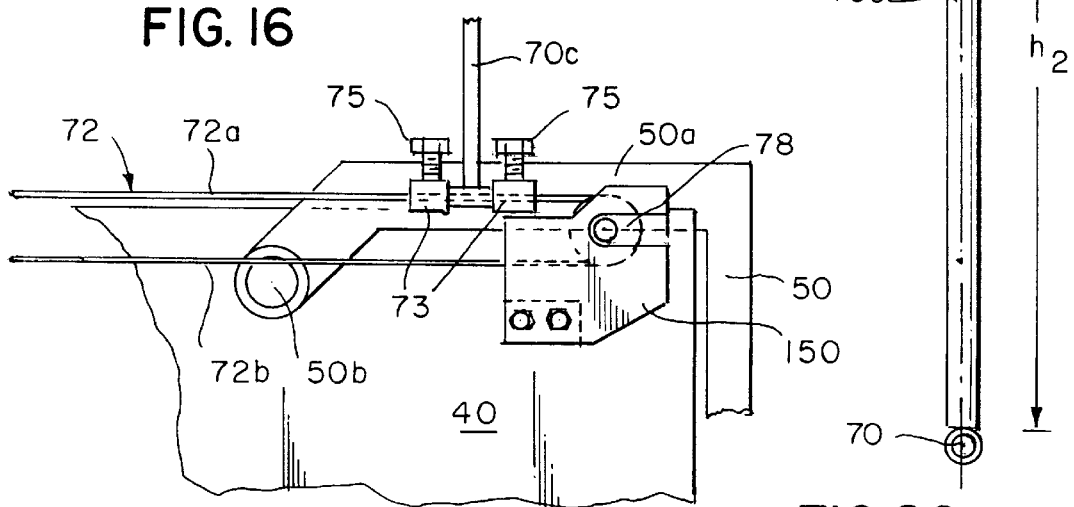
FIG. 19
FIG. 20

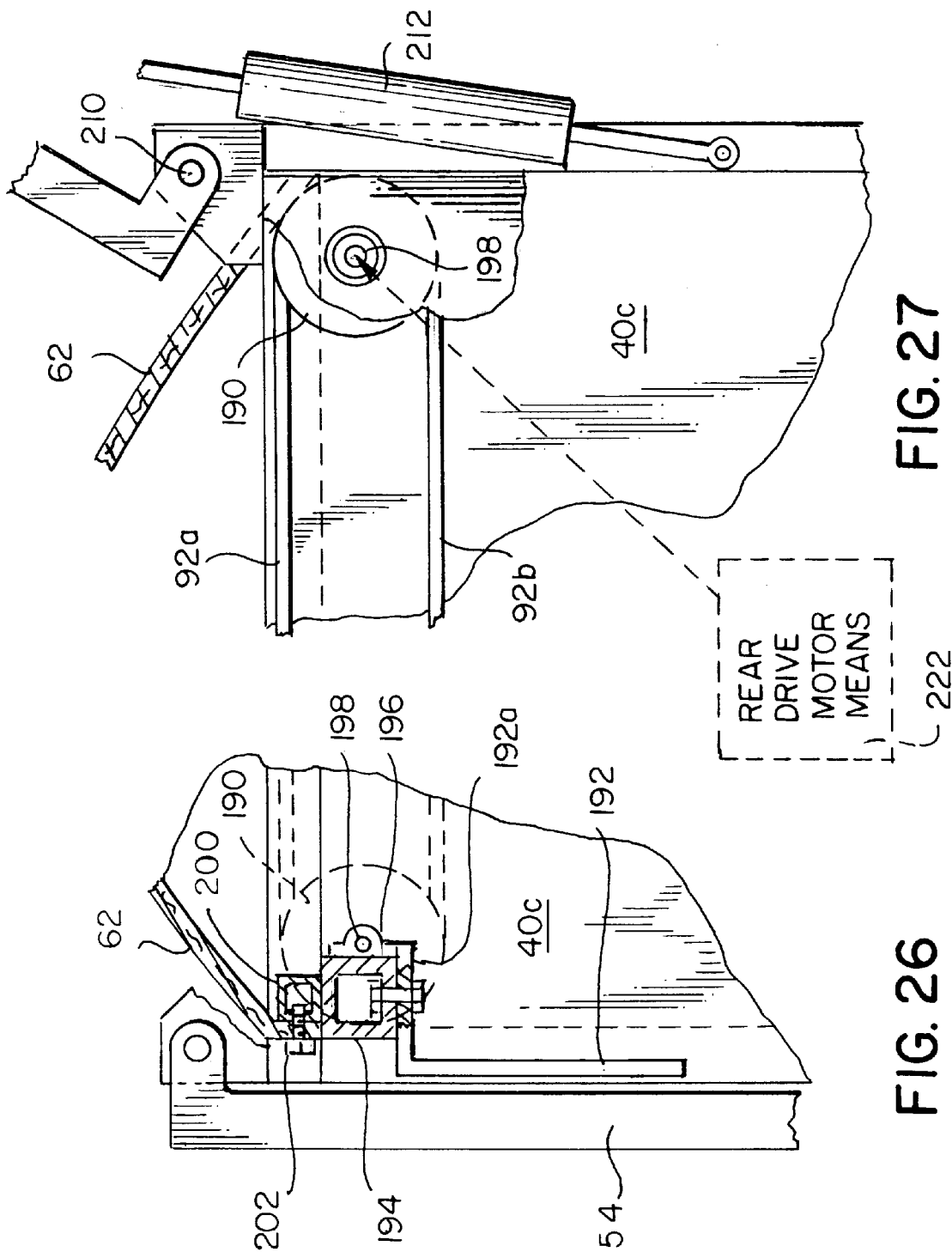

TARP COVER ARRANGEMENT FOR A TRANSFER DUMP SYSTEM

BACKGROUND OF THE INVENTION

1. Field of the Invention

This invention relates to a tarp cover arrangement for use in a transfer dump truck system, wherein a front tarp cover structure is used with the lead dump truck, and a rear tarp cover structure is used with each trailing dump trailer, the front and rear tarp cover structures being such that when they are in their uncovered conditions, the front portion of the trailing dump trailer of the transfer system may be introduced within the open rear end of the lead dump truck without disturbing either of the tarp cover structures.

2. Brief Description of the Prior Art

As evidenced by the Smith, et al., U.S. Pat. No. 5,143,496, it is well known in the patented prior art to provide a transfer dump truck system including a dump truck and one or more transfer trailers. The front dump box is mounted on the dump truck, and the rear boxes are mounted on their own trailer frames. A set of rails are mounted on the floor of the front dump box. The rear dump box(s) are mounted on a trailer with a similar set of rails. The front dump box is generally 96" wide and the rear dump box is generally 86" wide so that it can be inserted into the interior of the 96" wide box when transferring.

When the dump boxes are loaded and ready to dump, the driver releases the rear trailer from the front box, and dumps his load as normal. He then backs his dump truck up against the rear trailer where a set of male protrusions on the dump trailer match up with a set of female receivers on the front dump and the two lock together with a catch. The rear trailer has two axles and wheels on the bottom of the box which are controlled by electrical, hydraulic, or pneumatic motor means. When the trailers are locked together, the driver simply flips a switch on the rear of the rear trailers and the rear dump box travels forward into the interior of the front dump box mounted on the truck and a locking device holds the two dump boxes in place. This is the reason for the wider width of the front dump box and the narrower width of the rear trailer box.

The driver then dumps his load in the rear box, and then backs against the rear trailer frame and reverses the process described above. He then is ready to go back to his supply source to get another load.

The two main purposes for this type of dump transfer system is that one truck can now haul two types of loads (i.e., sand in the front dump box and rocks in the rear dump box) and it also allows the loads to be taken to areas where the maneuverability is limited (i.e., back yards, new construction areas, etc.).

It is also known in the art to provide tarp cover arrangements for open-topped truck containers to prevent the undesirable discharge of materials therefrom. Examples of such tarp cover systems are disclosed in the patents to Biancale U.S. Pat. No. 5,145,230 and Cramaro U.S. Pat. No. 4,189,178, wherein the tarp cover is supported by transverse bows or slots that ride upon the longitudinal side walls of the container. Drive means including a drive chain and sprocket driven by a hand crank to displace the tarp forwardly from an extended truck container covering position toward a collapsed condition in which the trailer is uncovered. These known tarp covering systems do not work satisfactorily on transfer dump truck systems owing to the limited clearance between the container walls when the rear box is transferred forwardly into the front box, since there is one inch or less clearance on each side when the rear box is introduced into the front box. Furthermore, the collapsed front and rear tarp covers and the drive means for the rear tarp cover would normally interfere with the complete introduction of the rear container within the front container.

The present invention was developed to avoid the above and other drawbacks of the prior art.

SUMMARY OF THE INVENTION

Accordingly, it is a primary object of the present invention to provide a tarp cover arrangement for uncovering the front and rear dump containers of a transfer system, wherein the front cover drive means are arranged at the front end of the front container, and the rear cover drive means are arranged at the rear end of the rear container.

According to a more specific object of the invention, the front drive means include drive pulleys that are mounted forwardly of the front wall of the front container, together with storage tray means for storing the collapsed front tarp forwardly of the front container front wall, whereby the collapsed front top cover will not obstruct the insertion of the rear container completely within the front container. The rearmost front tarp bow support is elevated to permit the bow to straddle the pivot arm means of the front container rear end closure door when the front tarp cover is in the expanded covering condition.

According to another object of the invention, the idler pulley means of the rear tarp cover drive means are mounted forwardly of the front wall of the rear container. thereby to minimize the extent to which the idler pulleys protrude laterally outwardly from the front end of the rear container. At the rear end of the rear container, the means for supporting the drive shaft of the drive pulley and drive sprocket gear are contained solely between the side walls of the rear container adjacent the upper edge portions thereof.

BRIEF DESCRIPTION OF THE DRAWINGS

Other objects and advantages of the invention will become apparent from a study of the following specification, when viewed in the light of the accompanying drawings, in which:

FIG. 14 is a front elevation view of a bow support of the front container of FIG. 10, and FIG. 15 is a detailed view of one end of the bow of FIG. 14 taken along line 15—15 of FIG. 13;

FIG. 16 is a detailed sectional view taken along line 16—16 of FIG. 13;

FIGS. 17 is a front elevation view of the rearmost bow of FIG. 13; and FIG. 18 is a sectional view taken along line 18—18 of FIG. 17;

FIG. 19 is a detailed side elevation view of the top rear portion of the front container of FIG. 10;

FIG. 20 is a rear elevation view of the rear bow extension rod of FIGS. 13 and 16;

FIG. 26 is a sectional view taken along line 26—26 of FIG. 25 with the rear closure door in the closed position;

FIG. 27 is a detailed side elevation view taken along line 27—27 of FIG. 25.

DETAILED DESCRIPTION

Figure 1:
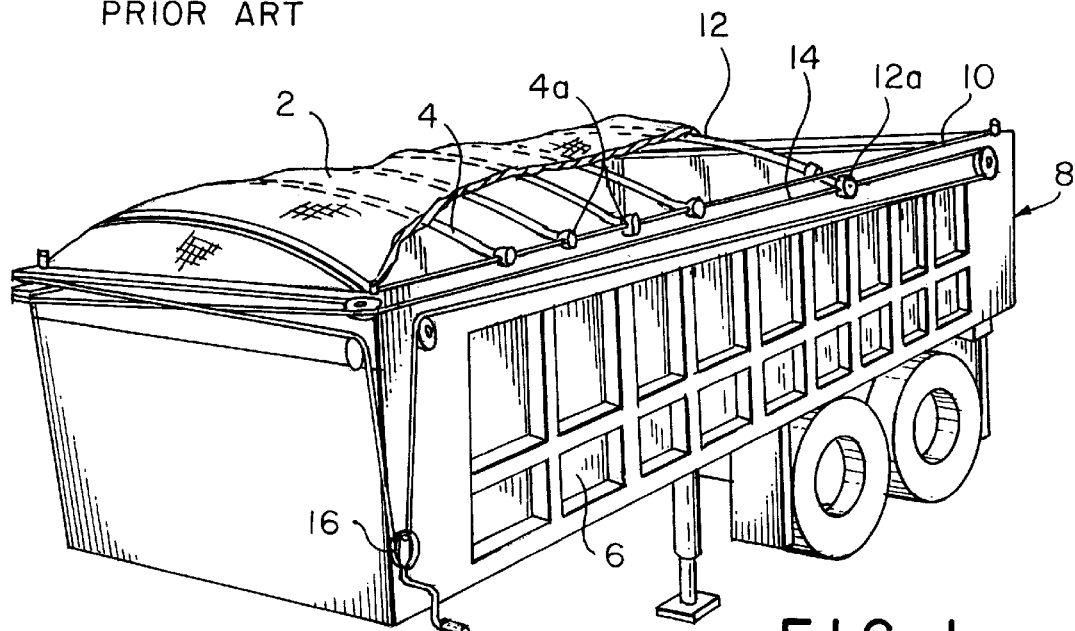
FIGS. 1 and 2 are front and rear perspective views, respectively of two types of tarp covering systems of the prior art.
Figure 2:
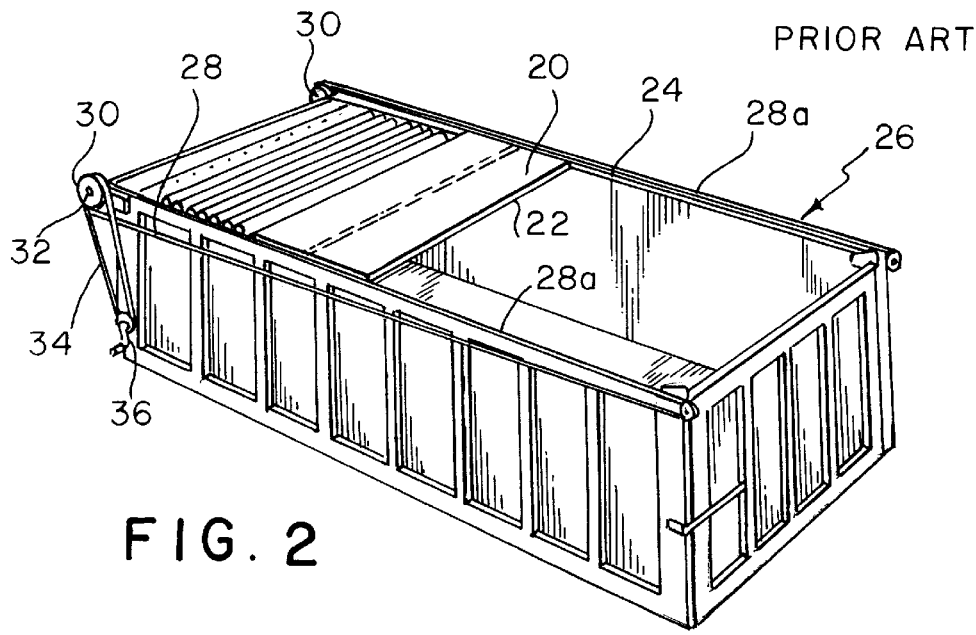
Figure 3:
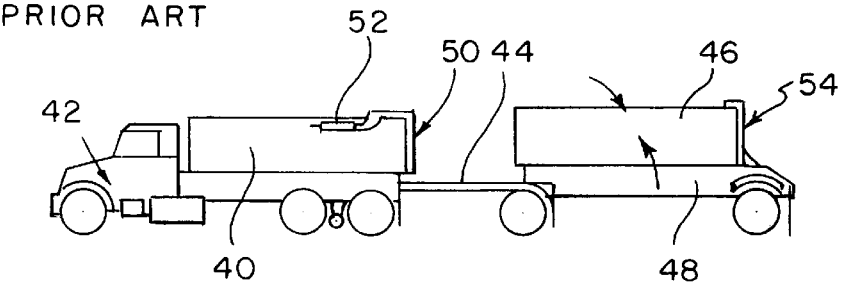
FIGS. 3–9 are schematic illustrations of a transfer dump truck system of the prior art.

Referring first more particularly to FIGS. 1 and 2, which are representative of the tarp cover systems of the Biancale U.S. Pat. No. 5,145,230 and the Cramero U.S. Pat. No. 4,189,178, respectively, it is known in the art to provide tarp cover systems for the open-topped containers or boxes of trailers for truck bodies, or the like. As shown in FIG. 1, the tarp 2 is supported by bows 4 that have end portions 4a that slide upon the upper edges of the longitudinal side walls 6 of the trailer container 8. The ends 4a of the bows are slidably guided upon corresponding runs of a guide cable 10. The rearmost bow 12 has an end portion 12a that is rigidly connected with the corresponding run of the drive cable 14 which is driven alternately in opposite directions by the hand crank drive means 16. Thus, when the hand crank 16 is rotated in one direction, the rearmost bow 12 is displaced forwardly of the container 8 and thereby uncovers the same, and rotation of the crank 16 in the opposite direction causes the rearmost bow 12 to be displaced rearwardly of the truck body, thereby to cause the tarp to cover the same. As shown in the embodiment of FIG. 2, the tarp 20 is supported by generally linear slats 22 that ride on the side walls 24 of the open-top container 26. The upper runs 28a of the guide cables 28 are driven at one end by the drive pulleys 30 which are driven by a drive sprocket 32, drive chain 34, and hand crank 36.

Figure 4:
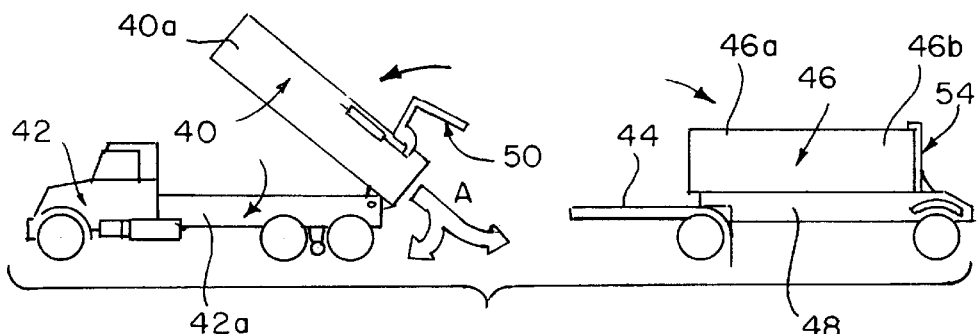
Figure 5:
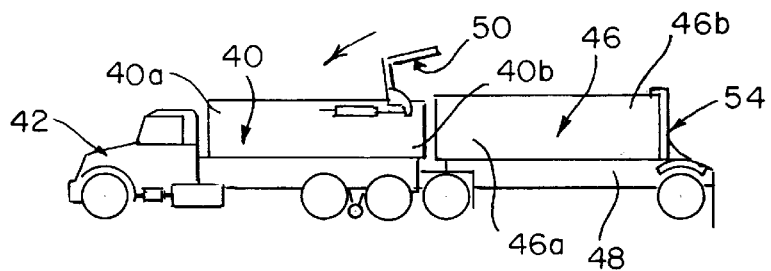
Figure 6:
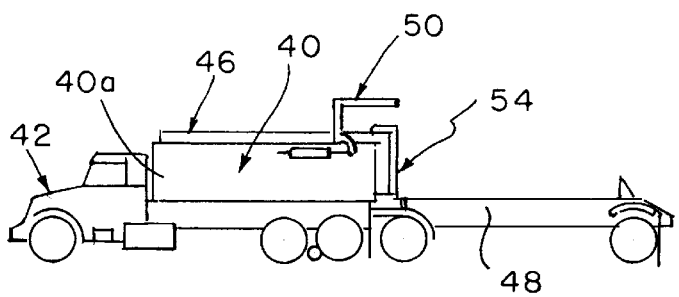
Figure 7:
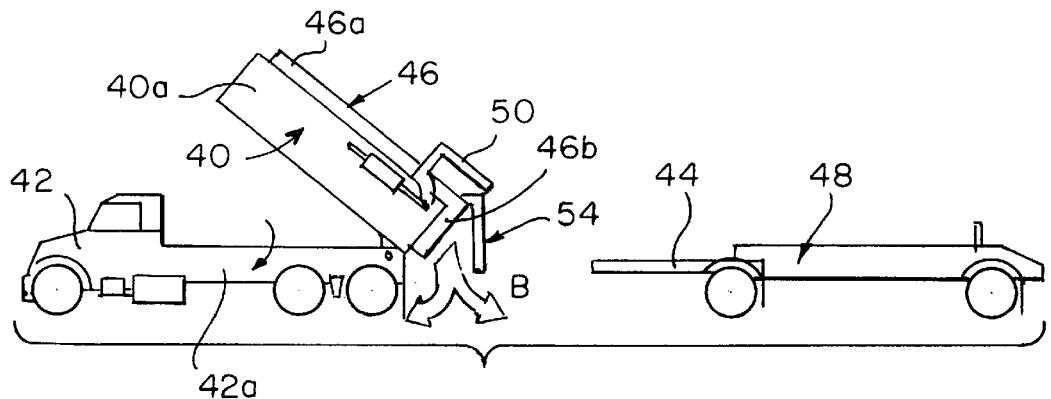
Figure 8:
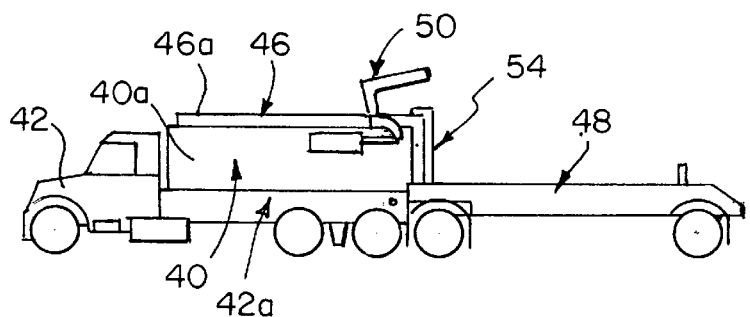
Figure 9:
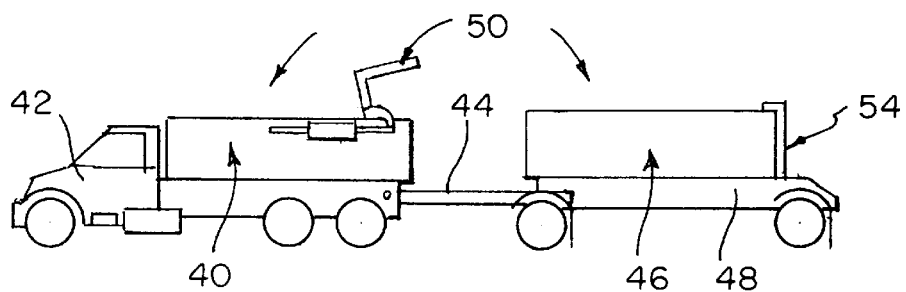
Figure 25:
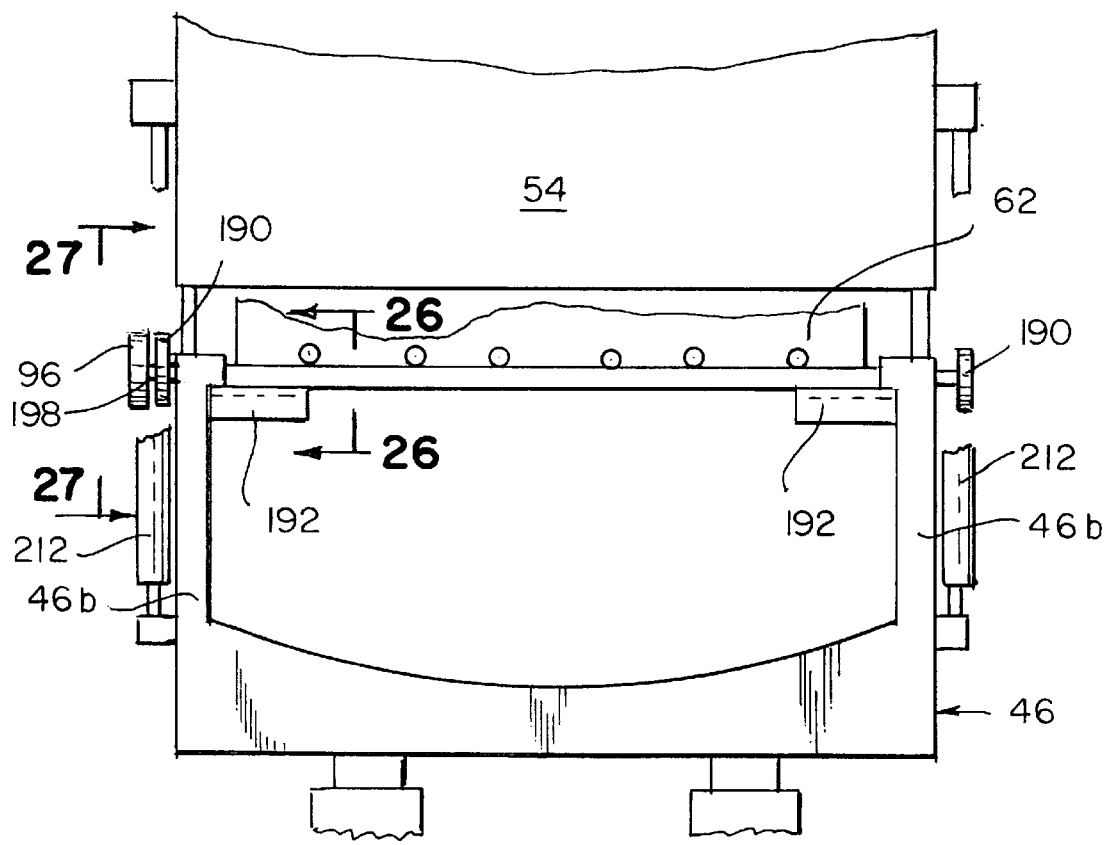
FIG. 25 is a rear view of the rear container, with the rear closure door in the elevated open position.

Referring now to FIGS. 3–9, it is also known, as shown by the Smith, et al., U.S. Pat. No. 5,143,496 to provide a transfer dump truck arrangement including a front container or box 40 that is mounted on the dump truck 42 and which pulls by trailer connection 44 a rear trailer having a dump body 46 that is mounted for sliding movement on a chassis frame 48. The rear end of the front container 40 is closed by a pivotally mounted rear door 50 that is operated by hydraulic motor means 52 between the closed position of FIG. 3 and the open position of FIG. 4. Similarly, the rear dump truck container 46 is closed by a pivotally connected rear closure door 54 that is operable between closed and open positions by similar hydraulic motor means 212 (FIG. 25). As shown in FIG. 4, when the trailer connection 44 is disengaged to separate the rear trailer body 46 from the front truck body 40, the dump lifting mechanism (not shown) of the truck 42 is operated to tilt the front body 40 to the illustrated elevated dumping position, thereby to discharge material illustrated by the arrow A through the open rear end of the front body 40. As shown in FIG. 4, after the front dump body 40 is lowered to its original position, and with the rear closure door 50 in the open position of FIG. 5, the rear trailer body 46 is displaced forwardly toward the open rear end 40a of the front dump truck body 40. The forward end 46a of the rear body 46 is telescopically introduced within the rear end 40a of the front container 40, as shown in FIG. 6, whereupon the chassis 48 is separated from the truck 42 as shown in FIG. 7. The dump operating mechanism of the truck 42 is then again operated to elevate both the front body 40 and the rear body 46, whereupon the material B is discharged from the rear container 46 via the open rear end 46b thereof. The two containers 40 and 46 are then lowered to the position of FIG. 8 on the front chassis 42a, whereupon the rear container 46 is displaced rearwardly to its initial position on chassis 48 of the rear trailer, as shown in FIG. 9.

Figure 10:
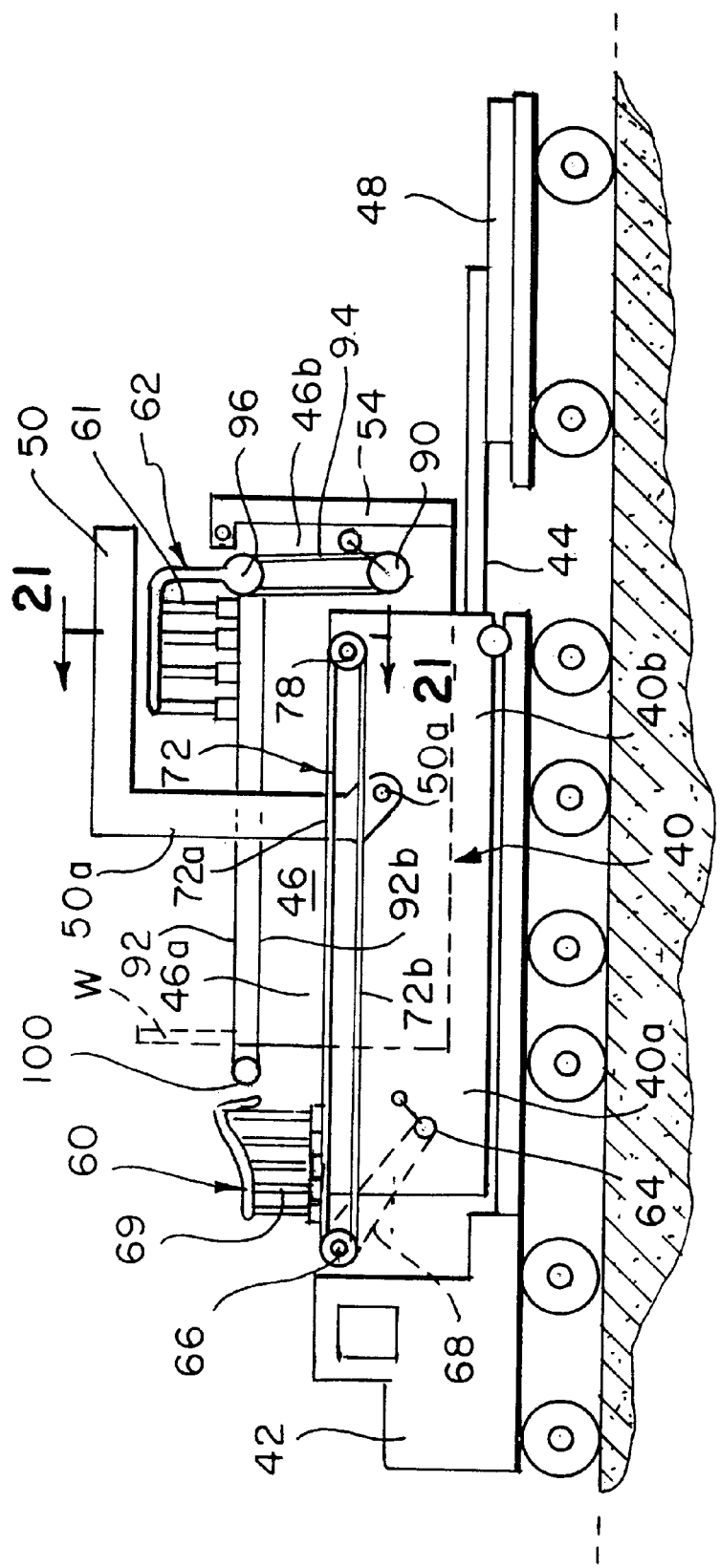
FIG. 10 is a schematic illustration of a transfer dump truck system including the tarp cover arrangement of the present invention.

Referring now to FIG. 10, which corresponds generally with the illustration of FIG. 6, the front dump truck body 40 is provided with a front tarp cover system 60, and the rear dump truck body 46 is provided with a rear tarp cover system 62. In accordance with the prior systems of FIGS. 1 and 2, the front tarp system 60 is operable between the illustrated collapsed open condition and the closed condition by means of a hand crank 64 that drives a sprocket gear 66 via sprocket chain 68, and thereby drives the rear bow 70 via endless cable 72 having a horizontal upper run 72a and the parallel lower run 72b. The endless cable 72 has a drive pulley 74 (FIG. 13) connected with shaft 76 of the drive sprocket gear 66, and an idler pulley 78 that is rotatably supported adjacent the rear end 40b of the front container 40.

In accordance with a characterizing feature of the present invention, the drive means for the rear tarp cover drive cable 92 are mounted adjacent the rear end 46b of the rear container 46. More particularly, the hand crank 90, sprocket chain 94, sprocket gear 96, and the associated drive pulley 198 (FIG. 25) are mounted at the rear end 46b of the rear container 46, and the idler pulley 100 of each guide cable 92 at each side of the container is mounted forwardly of the forward edge thereof, as best shown in FIGS. 22 and 23.

Figure 11:
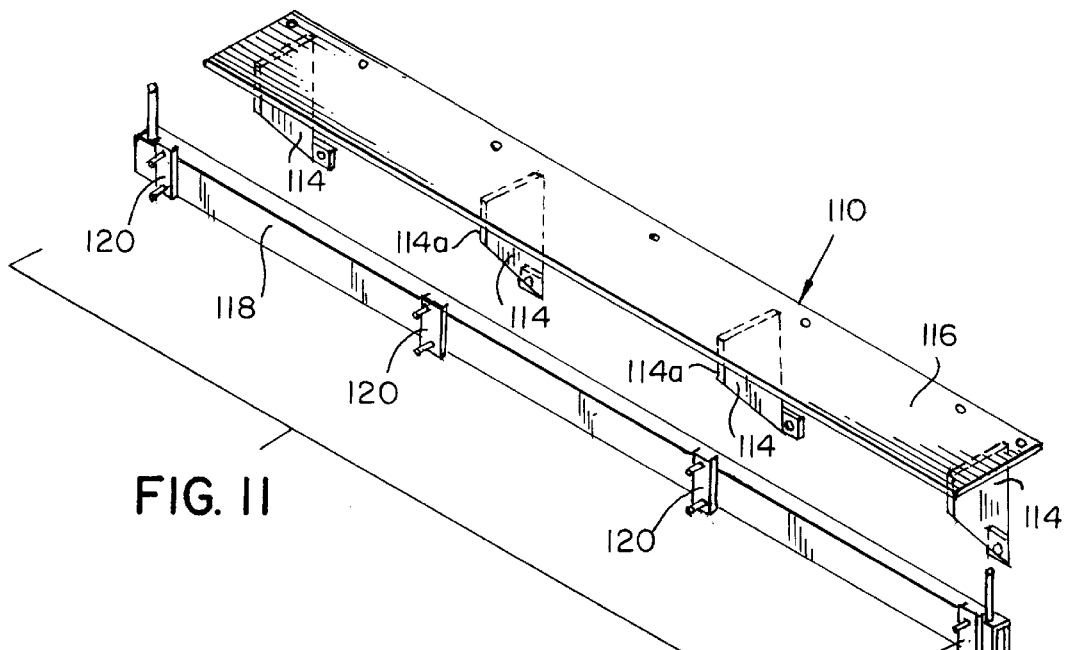
FIGS. 11 and 12 are exploded views of the front tarp storage tray of FIG. 10.
Figure 12:
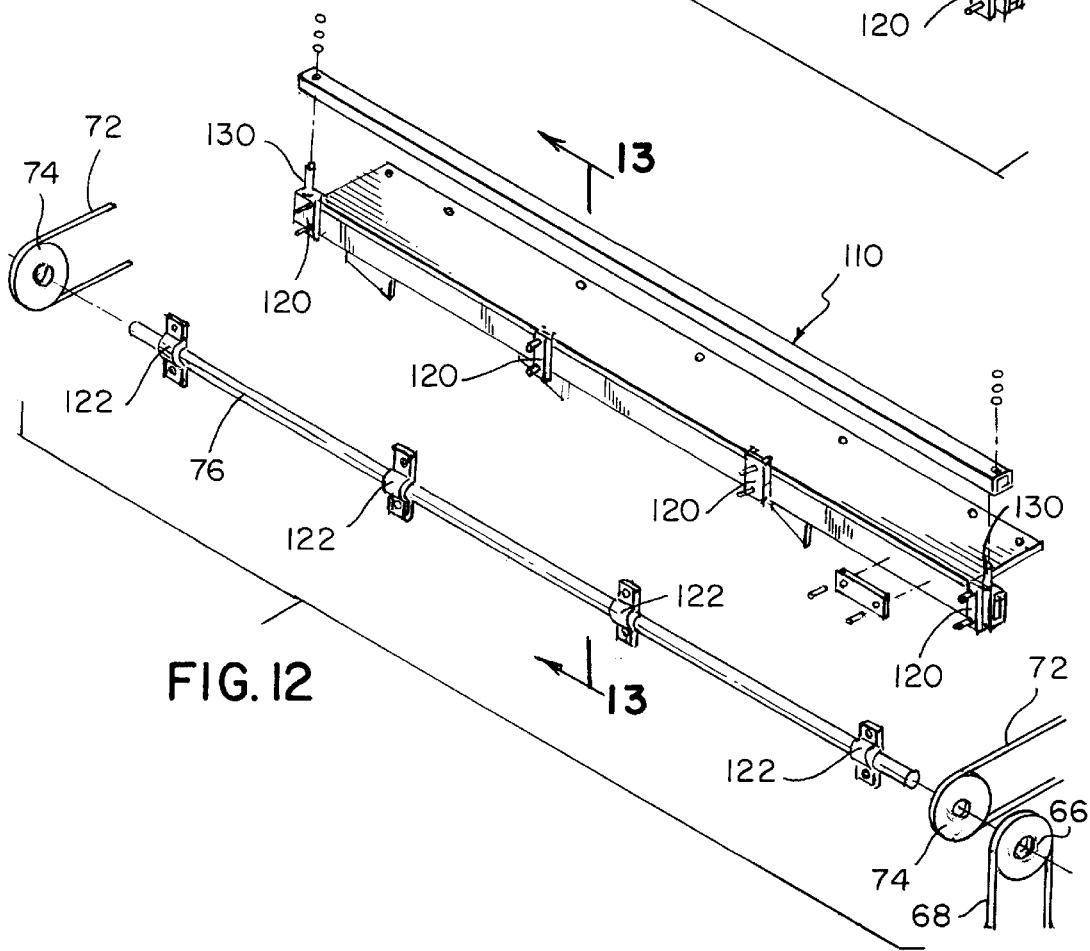
Figure 13:
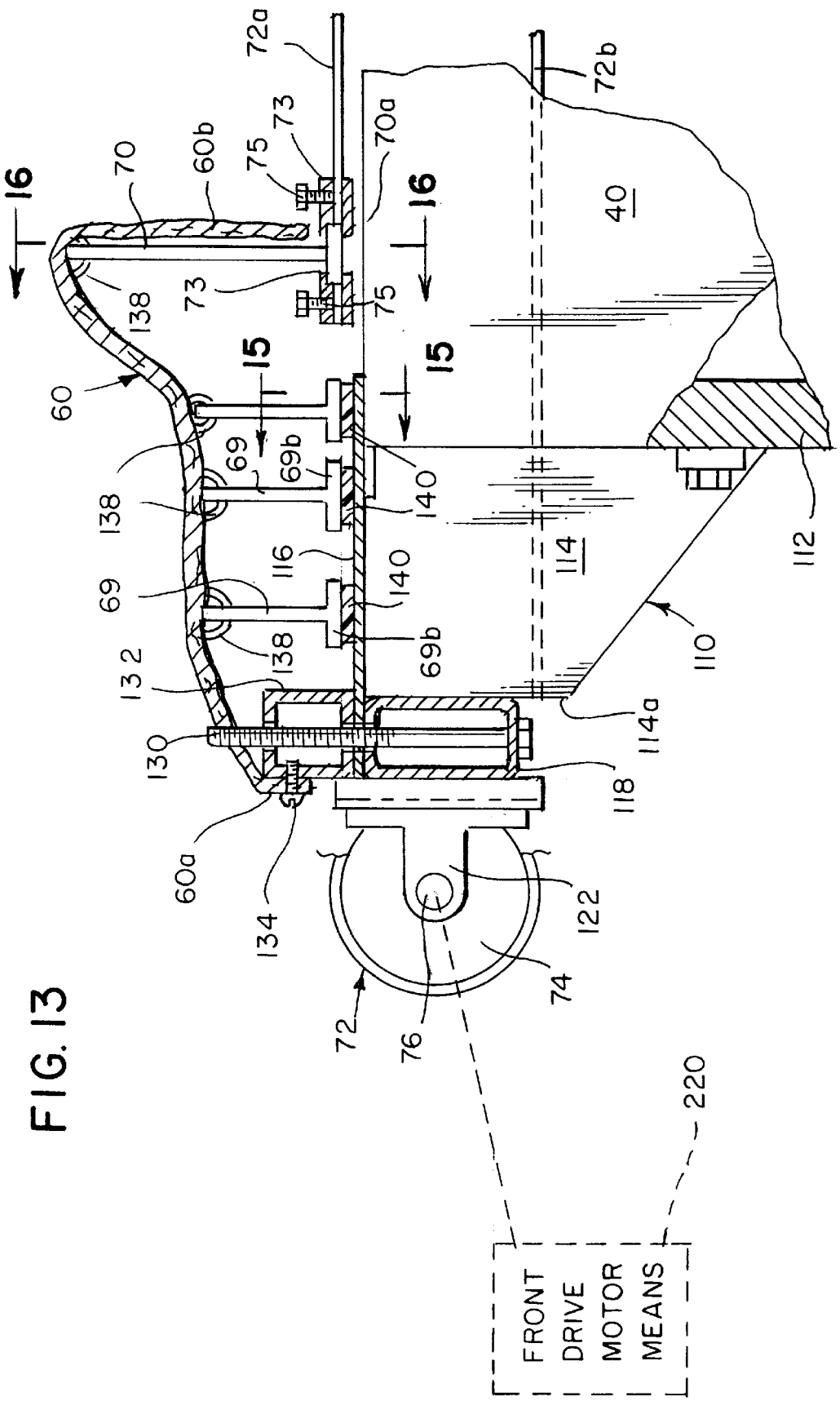
FIG. 13 is a detailed view of the front tarp storage tray.
Figure 28:
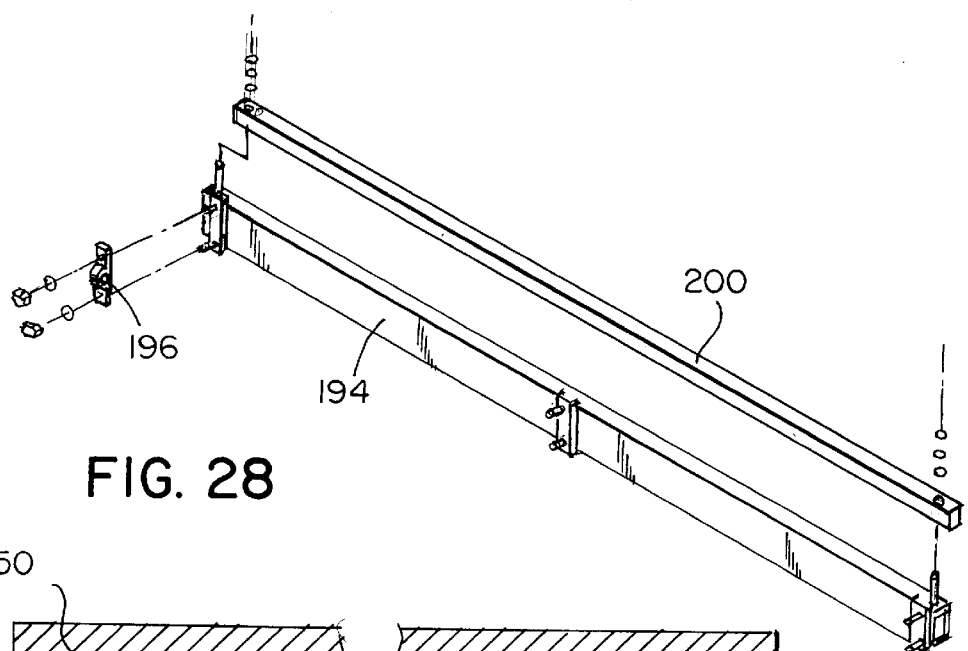
FIG. 28 is an exploded view of the tarp end support means at the rear end of the rear trailer.

In accordance with another characterizing feature of the invention, shown in FIGS. 11–13, in order to store the collapsed front tarp end arrangement 60 forwardly of the opening in the front container 40, storage tray means 110 are secured to the front wall 112 of the front container 40. The tray means 110 include a plurality of support gussets 114 that are welded to the bottom of the horizontal support table 116, and to the front surface of the front wall 112. Welded to the front edges 114a of the support gussets 114 is a transverse support tube 118 having rigidly secured thereto a plurality of spaced fittings 120 to which are bolted a plurality of bearing means 122 that rotatably support the front drive shaft 76. Bolted to the top of the support tube 118 by bolt means 130 is a tarp tube 132 to which the front end 60a of the tarp cover is secured by screw fasteners 134. On its under surface, the tarp 60 is provided with pockets 138 that receive the bows 69 and 70 of the front tarp system 60. As best shown in FIGS. 14 and 15, at their ends, the bows 69 are provided with flat portions 69a that carry tubular portion 69b that slideably receive the upper run 72a of the guide cable 72. Synthetic plastic slide plates 140 are fastened to the lower surface of the bow flat portion 69a by self-tapping screw means 142. As shown in FIG. 14, the bows 69 have a length $l_1$ that is greater than the width of the front container 40, and a height $h_1$ that is on the order of 12 inches. In order to provide clearance for the connecting portion 50a of the rear door 50 within the closed position of FIG. 19, the rearmost bow 70 is sectional and includes a center bow section 70*b* and a pair of vertical L-shaped extension sections or rods 70*c*. At their lower ends, the vertical extension sections 70*c* are connected with the tubular portion 70*a* that is slideably connected with the upper cable run 72*a*, and at its upper end, each vertical extension member includes an orthogonally-extending portion 70*d* that extends inwardly within the hollow tubular end portion 70*e* at each end of the center bow member 70*b*. Set screw means 71 rigidly connect the center bow section 70*b* with the associated vertical extension section 70*c*. The vertical height $h_2$ of the extension section 70*c* is on the order of 12 inches, and the height $h_3$ (FIG. 17) of the last bow 70 is on the order of 6 inches, whereby the total height $h_4$ of the center portion of the bow is on the order of 18 inches, thereby providing the appropriate clearance over the connecting portion 50*a* of the rear closure door 50, when the door is pivoted about pivot axis 50*b* toward the closed position shown in FIG. 19. Collar members 73 having set screws 75 rigidly connect the sleeve portion 70*a* of the last bow 70 with the upper run 72*a* of the drive cable 72.

Figure 21:
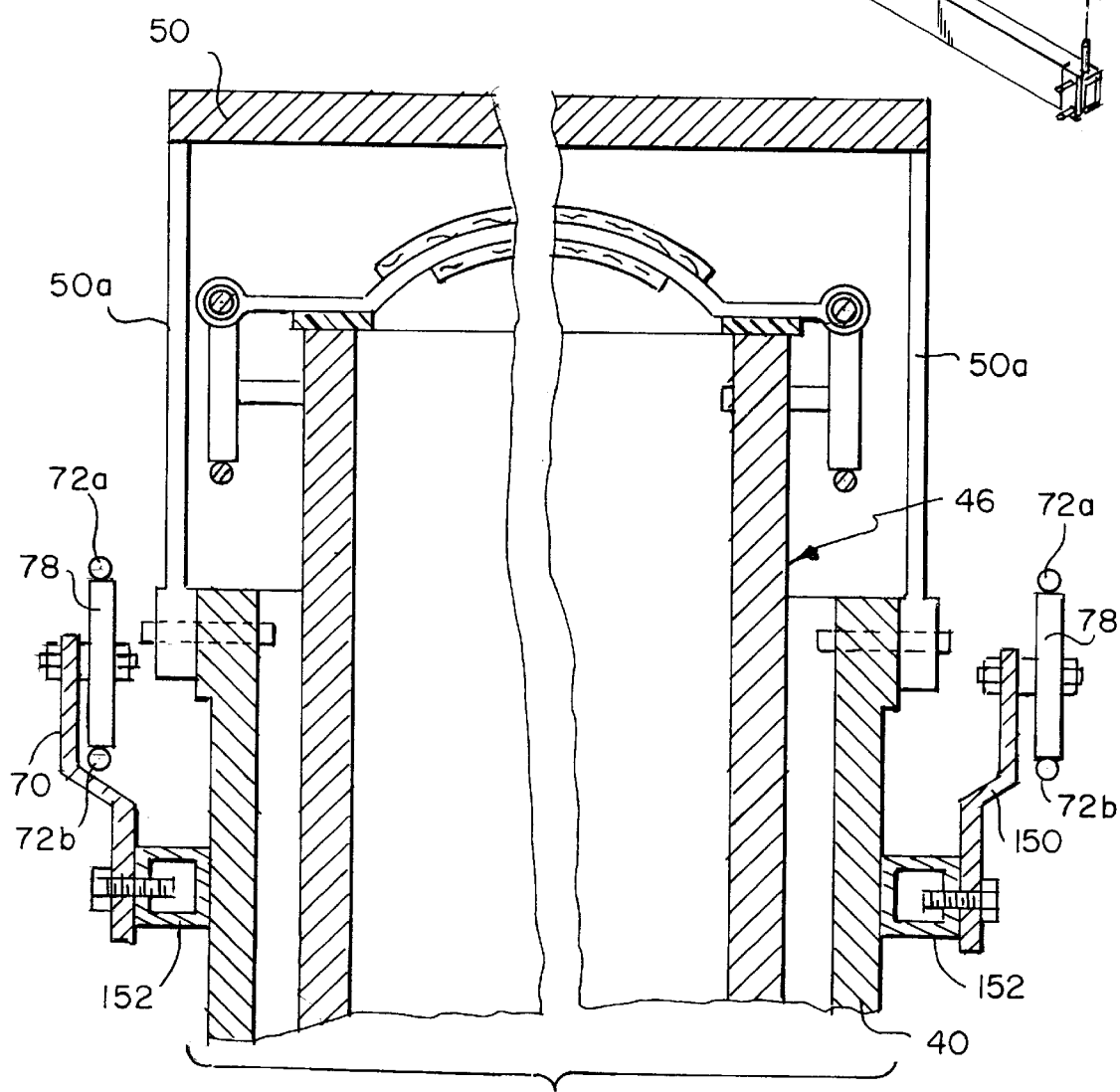
FIG. 21 is a detailed sectional view taken along line 21—21 of FIG. 10.

As shown in FIGS. 19 and 21, the idler pulleys 78 of the drive cable 72 of the front container 40 are supported by angle iron brackets 150 that are bolted or welded to side mounting tubes 152 that in turn are welded to the external surfaces of the longitudinal side walls of the front box 40.

Figure 22:
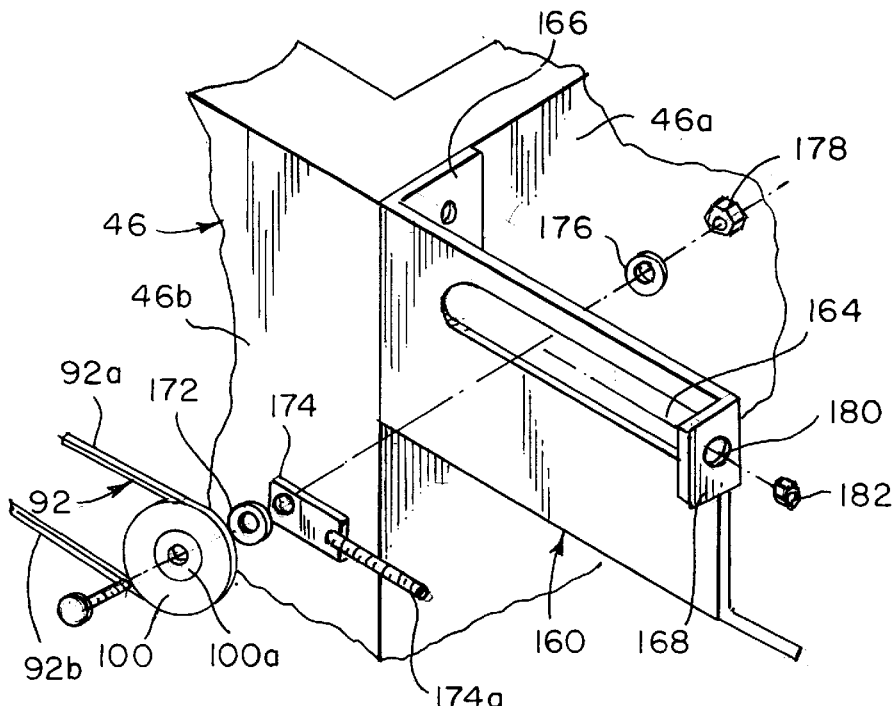
FIG. 22 is a front perspective exploded view of the idler pulley support means at the forward end of the rear container.
Figure 23:
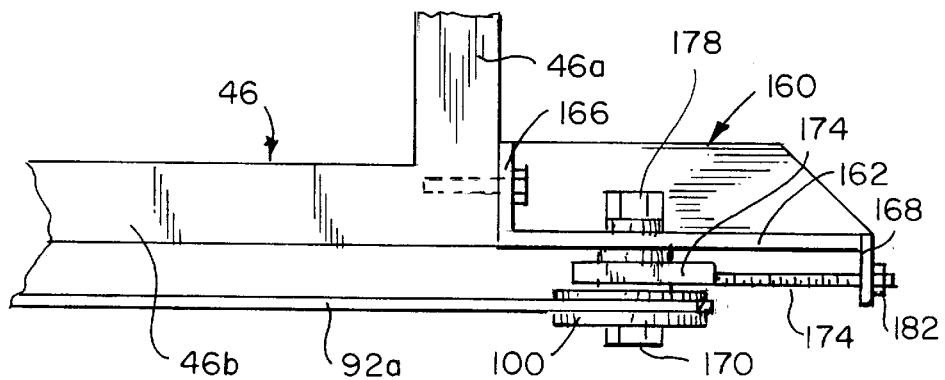
FIG. 23 is a top plan view of the idler pulley support means of FIG. 22.
Figure 24:
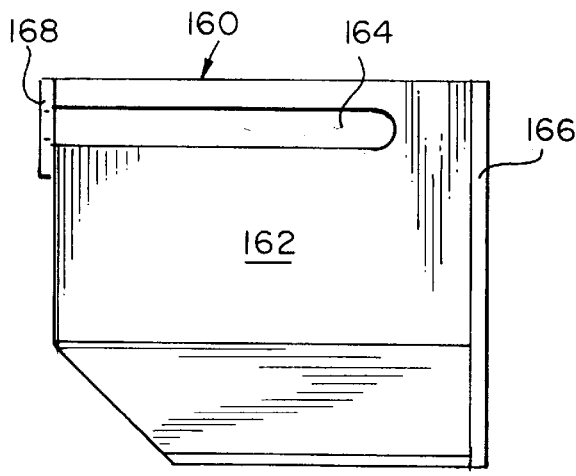
FIG. 24 is a side elevation view of the plate member of the idler pulley support means of FIGS. 22 and 23.

Referring now to FIGS. 22–24, in accordance with another characterizing feature of the invention, the idler pulley 100 of the drive cable 92 of the rear container 46 is mounted forwardly of the container front wall 46*a*, thereby to minimize the extent to which the idler pulleys extend laterally outwardly from the plane of the external surface of the longitudinal sidewalls 46*b* of the rear container 46. To this end, a mounting bracket 160 is provided including an angle iron body portion 162 containing a longitudinal slot 164, a mounting plate 166 welded to the rear end of the member 162, and an adjusting tab 168 welded to the forward end of the angle iron member 162. As shown in FIG. 23, the mounting member 166 and the adjusting tab 168 extend orthogonally in opposite directions from the upper portion of the angle iron member 162. The idler pulley 100 is journaled on a bolt member 170 that extends through the center bearings 100*a* of the idler pulley 100, the spacer washer 172, the adjusting plate 174, slot 164, washer 176, and locking nut 178. The threaded portion 174*a* of the adjusting member 174 extends through the cross bounding opening 180 contained in the adjusting plate 168, and is threadably connected with the adjusting nut 182, thereby permitting adjustment of the tension of the drive cable 92, as is known in the art.

Referring to FIGS. 25–28, in accordance with a further characterizing feature of the invention, the means for supporting the drive pulleys 190 and the drive sprocket 96 are contained completely between the longitudinal side walls 46*c* of the rear container 46. More particularly, a pair of angle iron brackets 192 are welded to the inside surfaces of the side walls 46*c* and support the transversely extending tubular bearing support member 194 that is bolted or welded to the horizontal upper flange portion 192*a* of the angle iron member 192. The tube member 194 supports the bearing means 196 that rotatably support the drive shaft 198. Bolted or welded to the upper end of the tube 194 is the tarp connecting tube 200 to which the rear end of the tarp cover 62 is connected by the self-tapping screw means 202. Since the support means for the drive shaft 198 are contained completely between the side walls 46*c* of the rear container 46, there is no interference with the hinge means 210 or the hydraulic motor operating means 212 of the rear closure door 54 of the rear container 46.

Of course, certain modifications such as the provision of wind screens W (FIG. 10) adjacent the ends of the containers, may be made in the disclosed invention as desired. Thus, in accordance with the present invention, in order to permit the rear container 46 to be introduced within the rear end of the front container 40 as shown in FIG. 10, the front tarp 60 and the bow support means therefore are arranged forwardly of the container 40 when in the collapsed condition, and the rear tarp 62 and the associated support bows 61 are arranged adjacent the rear end of the rear container 46. The drive means 90, 94, and 96 of the drive cable 92 are arranged adjacent to the rear end 46*b* of the rear container 46, and the support means for the idler pulley 100 are arranged forwardly of the front wall 46A of the rear container 46, and are supported inwardly of the side walls 46*c* thereof, thereby to afford the desired clearance relative to the connecting portions 50*a* of the rear door 50 of the front container 40.

Instead of the hand crank drive means for operating the endless drive pulleys, front motor means 220 (FIG. 13) and rear motor means 222 (FIG. 27) may be provided for driving the drive shafts 76 and 198, respectively. These motor means include electric motors, hydraulic motors, or pneumatic motors.

Figure 23A:
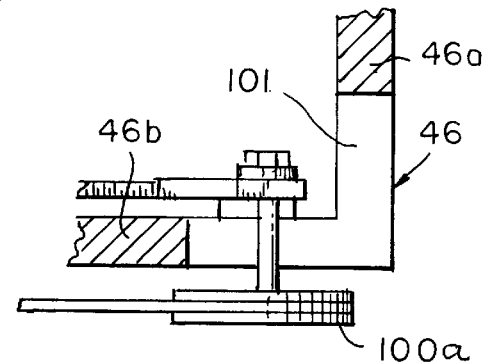
FIG. 23A is a modification of the idler pulley support means of FIG. 23.

Also, as shown in FIG. 23A, instead of mounting the rear container idler pulleys forwardly of the front wall, the rear container idler pulleys 100*a* could be mounted in recesses 101 contained in the upper front corners of the rear container 46.

While in accordance with the provisions of the Patent Statutes, the preferred forms and embodiments of the invention have been illustrated and described, it will be apparent to those skilled in the art that changes may be made without deviating from the inventive concepts set forth above.

What is claimed is:

1. A tarp cover arrangement for use in connection with a transfer dump truck system including a dump truck having an open-topped front load container, and at least one trailer having an open-topped rear load container the forward end of which is adapted to be introduced into the open rear end of the front container, comprising:

(a) front tarp cover means (60) operable between forwardly collapsed open and rearwardly expanded closed conditions for uncovering and for covering the front container, respectively;

(b) rear tarp cover means (62) operable between rearwardly collapsed open and forwardly expanded closed conditions for uncovering and for covering the rear container, respectively;

(c) first cover drive means arranged at the front end of the front container for operating said front tarp cover means alternately between said collapsed and expanded conditions, respectively, said front cover drive means including:

(1) a pair of first endless drive cables (72) extending longitudinally adjacent the top edges of the side walls of the front container, respectively;

(2) a pair of first drive pulleys (74) connected by a drive shaft (76) for supporting the forward ends of said first endless drive cables, respectively;

(3) first drive support means (110) for supporting said drive pulleys forwardly of the front end wall of the front container; and (4) a pair of first idler pulleys (78) for supporting the rear ends of said first endless drive cables adjacent the rear end of the front container, respectively;

(d) storage tray means (116) adapted for connection with, and extending forwardly of, the front container front wall for storing at least a substantial part of said front tarp cover, when in the collapsed condition, forwardly of the front container front wall; and (e) second cover drive means (96) arranged adjacent the rear end of the rear container for operating said rear tarp cover means from said expanded closed condition rearwardly toward a collapsed open condition adjacent the rear end of the rear container.

2. A tarp cover arrangement as defined in claim 1, wherein said front cover drive support means includes:

(a) a plurality of transversely spaced parallel vertical gussets (114) adapted to be secured at right angles to, and to extend forwardly from, the front face of the front wall (112) of the front container; and (b) a transverse bearing support member (118) connected with the forward edges of said gussets;

(c) said front drive shaft (76) being rotatably supported by said bearing support member.

3. A tarp cover arrangement as defined in claim 2, wherein said storage tray means includes a horizontal plate (116) supported by said gussets.

4. A tarp cover arrangement as defined in claim 1, wherein said front tarp cover means includes a plurality of first tarp support bows (69) adapted for sliding support by the upper edges of the side walls of the front container, and further including a rear bow means (70) having an effective height ($h_4$) that is greater than the effective height ($h_1$) of said first tarp support bows.

5. A tarp cover arrangement as defined in claim 4, wherein said rear bow means is sectional and includes:

(1) a center bow section (70b);

(2) a pair of vertical extension sections (70c) having upper ends connected with the ends of said center bow section, respectively;

(3) a pair of tubular sleeve portions (70a) connected with the lower ends of said vertical extension sections, respectively, said sleeve portions receiving the upper runs of the associated first endless drive cables, respectively; and (4) means (73) connecting said sleeve portions with said first drive cable upper runs, respectively.

6. A tarp cover arrangement as defined in claim 1, wherein said second cover drive means includes:

(1) a pair of endless second drive cables (92) extending longitudinally adjacent the upper edges of the side walls of the rear container, respectively;

(2) a pair of second drive pulleys (96) supporting the rear ends of said endless second drive cables, respectively;

(3) second drive support means (194) for supporting said second drive pulleys adjacent the rear end of the rear container;

(4) a pair of second idler pulleys (100) for supporting the front ends of said endless second drive cables, respectively; and (5) second idler support means (160) for supporting said idler pulleys adjacent of the front end wall of the rear container.

7. A tarp cover arrangement as defined in claim 6, wherein said second idler support means supports said second idler pulleys forwardly of the front wall of the rear container.

8. A tarp cover arrangement as defined in claim 6, wherein said second idler support means supports said second idler pulleys within corresponding recesses (101) contained in the upper front comers of the rear container.

9. A tarp cover arrangement as defined in claim 6, wherein said second drive support means are contained solely between the longitudinal side walls of said rear container.

10. A tarp cover arrangement as defined in claim 9, wherein said second drive support means includes:

(a) a pair of opposed support brackets (192) adapted to be secured to the inside surfaces of the rear container longitudinal side walls adjacent the upper edges thereof, and (b) a second cable drive shaft (198) rotatably supported by said second drive support means (194) and extending transversely across the rear container, said second drive pulleys being connected with said second cable drive shaft.

11. A tarp cover arrangement as defined in claim 10, wherein said second cable drive shaft includes a pair of end portions that extend through corresponding openings contained in the associated rear container side walls, respectively, said second drive pulleys being connected with the ends of said second cable drive shaft externally of the rear container, respectively.

12. A tarp cover arrangement as defined in claim 10, wherein said second cover drive means includes a drive sprocket gear (96) connected with said second drive shaft, rear hand crank means (90) rotatably connected with the rear end of said rear container, and a second endless drive sprocket chain (94) connecting said hand crank means with said second drive sprocket gear.

13. A tarp cover arrangement as defined in claim 10, wherein said rear tarp cover means includes a rear tarp cover, and further including a rear tarp tube (200) connecting the rear end of said rear tarp cover with said second drive support means (194).

14. A tarp cover arrangement second as defined in claim 1, wherein each of said first cover drive means and said second cover drive means includes motor means.

15. A tarp cover arrangement as defined in claim 14, wherein said motor means comprises an electric motor.

16. A tarp cover arrangement as defined in claim 14, wherein said motor means comprises an hydraulic motor.

17. A tarp cover arrangement as defined in claim 14, wherein said motor means comprises a pneumatic motor.

* * * * *